United States Patent
Curcio et al.

(10) Patent No.: US 7,346,007 B2
(45) Date of Patent: Mar. 18, 2008

(54) BANDWIDTH ADAPTATION

(75) Inventors: Igor Danilo Diego Curcio, Tampere (FI); Miikka Lundan, Tampere (FI); Emre Baris Aksu, Tampere (FI); Ru-Shang Wang, Coppell, TX (US); Viktor Varsa, Irving, TX (US); David Leon, Irving, TX (US)

(73) Assignee: Nokia Corporation, Espoo (FI)

( * ) Notice: Subject to any disclaimer, the term of this patent is extended or adjusted under 35 U.S.C. 154(b) by 1038 days.

(21) Appl. No.: 10/369,098

(22) Filed: Feb. 18, 2003

(65) Prior Publication Data
US 2004/0057420 A1 Mar. 25, 2004

(30) Foreign Application Priority Data
Sep. 23, 2002 (FI) .................................. 20021698

(51) Int. Cl.
*H04L 12/64* (2006.01)
(52) U.S. Cl. ................ 370/252; 370/352; 370/468
(58) Field of Classification Search ................ 370/252, 370/253, 310, 465, 468, 477
See application file for complete search history.

(56) References Cited

U.S. PATENT DOCUMENTS 6,292,834 B1* 9/2001 Ravi et al. ................... 709/233
2002/0073238 A1* 6/2002 Doron ......................... 709/246
2003/0083870 A1* 5/2003 Lee et al. .................... 704/229
2003/0198184 A1* 10/2003 Huang et al. ................ 370/231

FOREIGN PATENT DOCUMENTS

| GB | 2 367 219 | 3/2002 |
|---|---|---|
| WO | WO 02/052859 | 7/2002 |

OTHER PUBLICATIONS

R. Gubbi, "*Multimedia Streams and Quality of Service in the Next Generation Wireless Home Networks,*" Mobile Multimedia Communications, IEEE International Workshop, Nov. 15-17, 1999.
Tdoc S4-010349, "Improved Session Setup and Bandwidth Adaptation," Ericsson, 3GPP WG4 Meeting #17, Jun. 4-8, 2001, Naantali, Finland, 2pp.

(Continued)

*Primary Examiner*—Min Jung
(74) *Attorney, Agent, or Firm*—Ware, Fressola, Van Der Sluys & Adolphson, LLP

(57) ABSTRACT

The invention relates to a method for packet switched streaming of media, such as video and/or audio, from a streaming server (111) to a mobile client device (101) over an air-interface. The method comprises noticing a change in a downlink air-interface bandwidth, sending from the mobile client device (101) to the streaming server (111) a request for adapting streaming server transmission bit rate, receiving the request at the streaming server (111) and adapting the streaming server transmission bit rate in accordance with the request. According to the method, the request indicates to the streaming server (111) a current downlink air-interface bandwidth and that said adapting of the streaming server transmission bit rate is performed in accordance with said current downlink air-interface bandwidth.

47 Claims, 2 Drawing Sheets

OTHER PUBLICATIONS

Tdoc S4(01)0477, "Improved Session Setup and Bandwidth Adaption," Ericsson, 3GPP WG4 Meeting #18, Sep. 3-7, 2001, Erlangen, Germany, 5 pp.

Tdoc S4(02)0407, "Proposal for Bandwidth Selection in PSS," Ericsson, Microsoft, 3GPP WG4 Meeting #22, Jul. 22-26, 2002, Tampere, Finland, 7 pp.

"On RTCP Feedback for Mobile Multimedia Applications," by I. Curcio & M. Lundan, IEEE Intl. Conference, Aug. 26-29, 2002, Atlanta, Georgia, 12 pp.

Real Networks Internet publication on "Adaptive Stream Management," 10 pp., last updated May 17, 2000.

* cited by examiner

BANDWIDTH ADAPTATION

CROSS-REFERENCE TO RELATED APPLICATIONS

This application claims priority under 35 USC §119 to Finnish Patent Application No. FI 20021698 filed on Sep. 23, 2002.

FIELD OF THE INVENTION

The invention relates to packet switched streaming of media from a streaming server to a mobile client device over an air-interface.

BACKGROUND OF THE INVENTION

In multimedia streaming a sequence of 'moving images' with sound is sent from a streaming server to a client device. In contrast to the technique in which an entire media file has to be arrived at the client before it can be played, the streaming technique enables the sending of media (video and/or audio) from the streaming server to the client in a continuous manner and the playing of the media as it arrives at the client.

A packet switched streaming service (PSS) is currently being standardized for mobile environment by 3GPP (3$^{rd}$ Generation Partnership Project). Compared to a fixed landline Internet environment, new problems specific to the mobile environment arise. These problems are mostly due to the different restrictions of mobile systems.

In mobile systems, information between network and mobile communications devices is transferred over a radio path, i.e. over an air-interface with the aid of radio frequency channels. The air-interface provides only limited radio resources (limited bandwidth) for communication. Accordingly, it is desired to use the limited bandwidth of the air-interface as efficiently as possible (so that radio resources are not wasted) in order to guarantee proper functioning of the system.

An example of a communications system capable of streaming media (streaming video and/or audio) is shown in FIG. 1. The system comprises a streaming server 111 which is coupled to an IP-network (Internet Protocol) 104. The IP-network 104 may be, for example, the Internet or a service provider operator's intranet (an intranet network belonging to the operator's domain). The IP-network 104 is coupled to a core network 103 of a mobile communications network via a $G_i$ interface. The mobile communications network also has a radio access network (RAN) 102 coupled to the core network 103. The radio access network 102 provides mobile communications devices 101 with access to the mobile communications network over an air-interface. The mentioned access may be provided either by circuit switched means (circuit switched voice or data call) or packet switched means or both. In the following, GPRS (General Packet Radio Service) is used as an example of a packet switched means to communicate over the air-interface.

Streaming media is typically performed by sending pre-recorded (multi)media (video and/or audio) files from the streaming server 111 to a mobile communications device 101 (hereinafter referred to as a client device 101) in a compressed form. Depending on the codecs used to encode the media content, the streaming server may send the media to the client device 101 at a set of different bit rates. As an example, the server may have the content encoded at three bit rates. These bit rates may, for example, be produced by three different codecs or by one multi-rate codec. It should usually be the case that the higher the bit rate, the better the received picture and sound quality. However, a higher bit rate consumes more of the limited air-interface bandwidth.

The standardized GPRS Release '97 networks and GPRS Release '99 (EGPRS, Enhanced GPRS) networks use TDMA (Time Division Multiple Access) time slots for communication over the air-interface. The number of time slots together with the amount of bits used for error correction define the effective bandwidth for the payload of the connection. Accordingly, in order to enable the use the limited radio resources efficiently, there are different time slot and coding scheme (error correction) combinations defined for both GPRS Release '97 and Release '99 networks.

For example, GPRS Release '97 networks provide the following time slot and coding scheme possibilities (for up to 3 time slots):

| bit rates [kbps] | TS 1 + 1 | TS 2 + 1 | TS 3 + 1 |
|---|---|---|---|
| CS-1 | 9.05 | 18.1 | 27.15 |
| CS-2 | 13.4 | 26.8 | 40.2 |

The table shows the effective air-interface downlink bandwidth (i.e. bit rate) available for payload (user data, useful data) depending on the time slot (TS) and coding scheme (CS) configuration. For example, in the configuration in which the used coding scheme is CS-1 and the used time slot configuration is TS 2+1 (2 time slots used in downlink direction (RAN->client device) and 1 time slot used in uplink direction (client device->RAN)), the available downlink bandwidth is 18.1 kbps. This is actually the effective available bandwidth for payload, for example, streaming (multi)media. Concerning GPRS, the generic term radio access network (RAN) is considered to comprise base (transceiver) stations (BTS) and base station controllers (BSC).

Correspondingly, GPRS Release '99 networks provide the following time slot and coding scheme possibilities (for up to 2 time slots):

| bit rates [kbps] | TS 1 + 2 | TS 2 + 2 |
|---|---|---|
| MCS-1 | 8.80 | 17.6 |
| MCS-2 | 11.2 | 22.4 |
| MCS-3 | 14.8 | 29.6 |
| MCS-4 | 17.6 | 35.2 |
| MCS-5 | 22.4 | 44.8 |
| MCS-6 | 29.6 | 59.2 |
| MCS-7 | 44.8 | 89.6 |
| MCS-8 | 54.4 | 108.8 |
| MCS-9 | 59.2 | 118.4 |

Again, the table shows the effective air-interface downlink bandwidth available for payload depending on the time slot (TS) and coding scheme (MCS (Modulation and Coding Scheme)) configuration. For example, in the configuration in which the used coding scheme is MCS-6 and the used time slot configuration is TS 2+2 (2 time slots used in downlink direction and 2 time slot used in uplink direction) the available downlink bandwidth is 59.2 kbps.

It should be noted that the available air-interface downlink bandwidth for streaming media (i.e. the available air-interface downlink bit rate for streaming) may vary drastically during a streaming session. The radio access network 102 may, for example, have to increase air-interface error protection during a streaming session, if the quality of the received streaming media in the client device 101 drops due to changed air-interface conditions (bad radio link quality). Alternatively, or in addition, the radio access network (GPRS) may have to change the time slot configuration due to changed load conditions in the radio access network. Both of these situations may result in a change in the available air-interface bandwidth.

It should be noted that the air-interface bandwidth is a different concept than a server bandwidth (i.e. the bit rate on which the server sends the streaming media).

Let us consider an example, in which the original air-interface bandwidth for a streaming session is 59.2 kbps (GPRS Rel. '99: MCS-6 & TS 2+2) and it has been agreed, in streaming session setup, that the streaming server 111 sends at a bit rate 59 kbps. During the streaming session, the radio access network 102 then has to increase air-interface error protection due to changed air-interface conditions from MCS-6 to MCS-5. This results in a new time slot and coding scheme combination, namely: MCS-5 & TS 2+2. After the change, the available air-interface bandwidth is 44.8 kbps. If the streaming server continues sending at the bit rate of 59 kbps, this will result in larger delays and packet losses due to network buffer overflow since the air-interface can at most sustain the bit rate of 44.8 kbps which is considerably less than the server sending bit rate of 59 kbps. Ultimately, the streaming session may even be lost.

In order to overcome this problem, Ericsson has proposed a set of solutions in the following publications:

Ericsson, *Improved Session Setup and Bandwidth Adaptation*, 3GPP TSG-SA WG4 Meeting #17, Tdoc S4-010349, Jun. 4-8, 2001, Naantali, Finland.

Ericsson, *Improved Session Setup and Bandwidth Adaptation*, 3GPP TSG-SA WG4 Meeting #18, Tdoc S4-(01)0477, Sep. 3-7, 2001, Erlangen, Germany.

Ericsson, *Proposal for Bandwidth Selection in PSS*, 3GPP TSG-SA WG4 Meeting #22, Tdoc S4-(02)0407, Jul. 22-26, 2002, Tampere, Finland.

According to the proposed solutions, the possible bit rates at which the streaming server 111 can send the streaming media are communicated beforehand to the client device 101. The server 111 or the client 101 may notice changed network conditions during an active session. If the server 111 notices changed network conditions, it may switch bit streams (this is understood such that the server 111 may switch from sending at a first bit rate to sending at another bit rate). If the client 101 notices changed network conditions, it may request a bit stream switch between the current bit stream and another bit stream (known to the client 101) by sending a particular message to the server 111. The server may then either accept or disregard the request for a bit stream switch.

In the example described in the foregoing, after the client device 101 changes the coding scheme from MCS-6 to MCS-5, it should send a request to the server 111 requesting the server to switch sending at a different bit rate. Since the available air-interface bandwidth after the change is 44.8 kbps, the client would most likely request the server to send at a bit rate next lowest to 44.8 kbps, for example 44 kbps as the case might be.

Whilst this solution may be a good one if there is an bit stream alternative close to 44.8 kbps, the situation is worse if the bit rate next lowest to 44.8 kbps is further away, for example, 30 kbps. Then, if the server 111 begins sending at 30 kbps, almost 15 kbps of air-interface bandwidth is wasted (not usable for streaming media). It is to be noted that using, in multimedia streaming, a bit rate almost 15 kbps lower than the one theoretically possible, will most probably negatively affect the quality of the picture and/or sound received at the client device 101.

Since there are and will be many different bit rates defined for the air-interface, as shown concerning the GPRS radio bearer in the tables in the foregoing, it is very unlikely that the streaming server 111 would have streaming media encoded at all the corresponding bit rates. Therefore, the scenario presented in the previous paragraph may well be realistic. Accordingly, there is a need for a new solution for coping with air-interface bandwidth variations without considerable waste of the available bandwidth.

SUMMARY OF THE INVENTION

It is an object of the present invention to improve the method described in the foregoing in order to better cope with air-interface bandwidth variations.

According to a first aspect of the invention, there is provided a method for packet switched streaming of media from a streaming server to a mobile client device over an air-interface, the method comprising the steps of:

noticing a change in a downlink air-interface bandwidth;

sending from the mobile client device to the streaming server a request for adapting streaming server transmission bit rate;

receiving the request at the streaming server;

adapting the streaming server transmission bit rate in accordance with the request, wherein the request indicates to the streaming server a current downlink air-interface bandwidth and that said adapting of the streaming server transmission bit rate is performed in accordance with said current downlink air-interface bandwidth.

The term media is considered to mean either video or audio or another media, such as still image, or any combination thereof, i.e multimedia.

In contrast to a prior-art solution in which the client requested the streaming server to send at a specific bit rate and the streaming server either blindly obeyed the client device or disregarded the request, the present invention enables the sending of the current downlink air-interface bandwidth to the streaming server so that the server can then adapt its transmission bit rate in the most appropriate way.

Whilst the prior art solution does not rely on any dynamic adaptation capabilities of the streaming server, an embodiment of the invention gives the streaming server a possibility of using its dynamic adaptation capabilities for fitting its transmission bit rate into the air-interface bandwidth by using temporal scalability, for example, by skipping the transmission of some video frames. In that embodiment the streaming server is given the possibility to co-operate with the client device in order to achieve a better QoS for a streaming session.

According to a second aspect of the invention, there is provided a mobile client device for receiving packet switched streaming media from a streaming server over an air-interface, the mobile client device comprising:

means for noticing a change in a downlink air-interface bandwidth; and means for sending to the streaming server a request for adapting streaming server transmission bit rate, the request containing information for indicating to the streaming server a current downlink air-interface bandwidth for adapting the streaming server transmission bit rate in accordance with said current downlink air-interface bandwidth.

According to a third aspect of the invention, there is provided a streaming server for sending packet switched streaming media to a mobile client device over an air-interface, the streaming server comprising:

means for receiving a request for adapting streaming server transmission bit rate, the request containing information indicating a current downlink air-interface bandwidth; and means for adapting the streaming server transmission bit rate in accordance with said current downlink air-interface bandwidth.

According to a fourth aspect of the invention, there is provided a system comprising a streaming server and a mobile client device, for packet switched streaming of media from the streaming server to the mobile client device over an air-interface, the system comprising, at the mobile client device:

means for noticing a change in a downlink air-interface bandwidth; and means for sending to the streaming server a request for adapting streaming server transmission bit rate, the request containing information for indicating to the streaming server a current downlink air-interface bandwidth, the system further comprising, at the streaming server:

means for receiving the request; and means for adapting the streaming server transmission bit rate in accordance with said current downlink air-interface bandwidth.

According to a fifth aspect of the invention, there is provided a computer program product executable in a mobile client device, the computer program product comprising program code for:

causing the mobile client device to notice a change in a downlink air-interface bandwidth; and causing the mobile client device to send to the streaming server a request for adapting streaming server transmission bit rate, the request containing information for indicating to the streaming server a current downlink air-interface bandwidth for adapting the streaming server transmission bit rate in accordance with said current downlink air-interface bandwidth.

According to a sixth aspect of the invention, there is provided a computer program product executable in a streaming server, the computer program product comprising program code for:

causing the streaming server to receive a request for adapting streaming server transmission bit rate, the request containing information indicating a current downlink air-interface bandwidth; and causing the streaming server to adapt the streaming server transmission bit rate in accordance with said current downlink air-interface bandwidth.

According to yet another aspect of the invention, there is provided a method for packet switched streaming of media from a streaming server to a mobile client device over an air-interface, the method comprising the steps of:

indicating to the streaming server a current downlink air-interface bandwidth; and adapting a streaming server transmission bit rate in accordance with said current downlink air-interface bandwidth.

Dependent claims contain preferable embodiments of the invention. The subject matter contained in dependent claims relating to a particular aspect of the invention is also applicable to other aspects of the invention.

BRIEF DESCRIPTION OF THE DRAWINGS

Embodiments of the invention will now be described by way of example with reference to the accompanying drawings in which.

DETAILED DESCRIPTION

Figure 1:
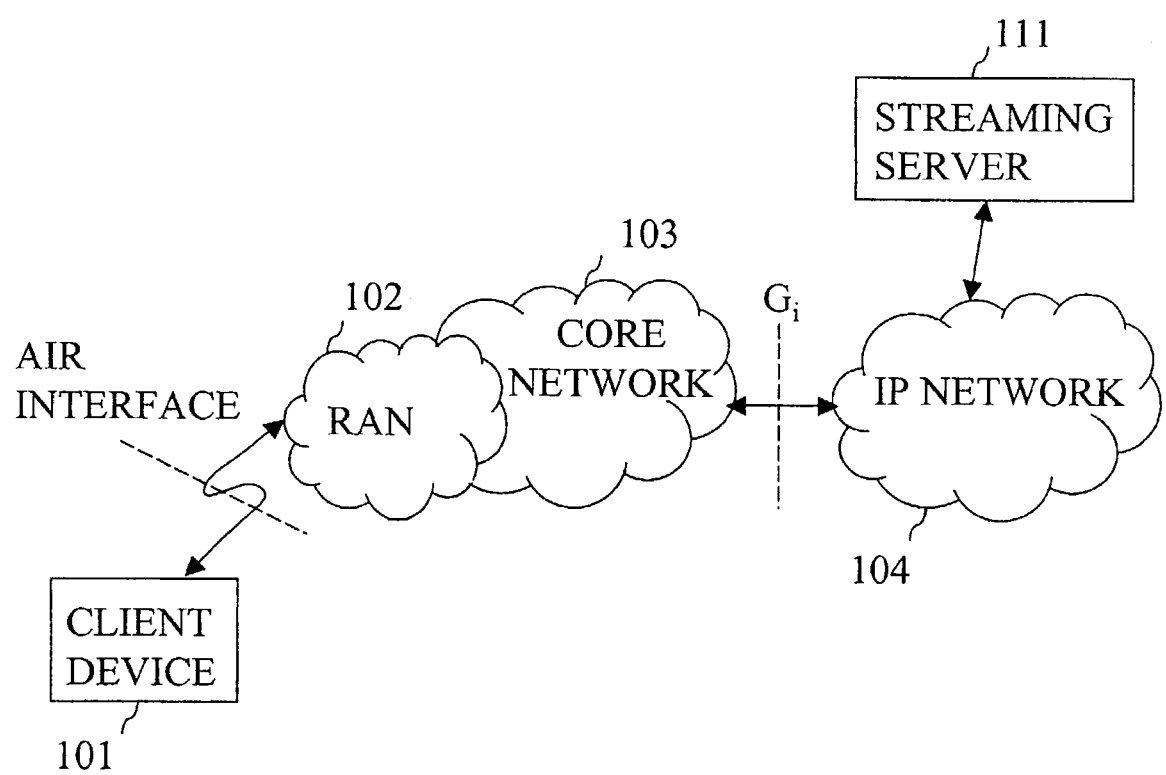
FIG. 1 shows a communications system capable of streaming media.

FIG. 1 has been described already in the foregoing. However, the system shown in FIG. 1 can also be used in the preferred embodiments of the invention. Accordingly, the system comprises a streaming server 111 which is coupled to an IP-network 104. The IP-network 104 may be, for example, the Internet or a service provider operator's intranet. The IP-network 104 is coupled to a core network 103 of a mobile communications network via a $G_i$ interface. The mobile communications network also has a radio access network (RAN) 102 coupled to the core network 103. The radio access network 102 provides mobile communications devices 101 with access to the mobile communications network over an air-interface. The mentioned access may be provided either by circuit switched means (circuit switched voice or data call) or packet switched means or both. In the following, GPRS (General Packet Radio Service) is used as an example of a packet switched means to communicate over the air-interface.

The aforementioned mobile communications network may be, for example, a '$2.5^{th}$ generation' GPRS or EGPRS network, or a $3^{rd}$ generation cellular mobile communications network.

In a preferred embodiment of the invention, a streaming session is initiated between the client device 101 and the streaming server 111. RTSP (Real Time Streaming Protocol) protocol is used in the streaming session setup. Once the session has been established, the streaming itself may be performed (i.e. media flow may be sent) according to RTP (Real time Transport Protocol) or another protocol. However, if it is desired to make a change in the established session, this will again be done by using RTSP.

In the streaming session setup, the possible bit rates to be used in the streaming session may be communicated from the streaming server 111 to the client 101. This can be done in a message body of an RTSP DESCRIBE message sent from the server 111 to the client 101. The message body may be formed using SDP (Session Description Protocol) protocol. One example of such an SDP body (only video part is shown) is:

m=video 0 RTP/AVP 98
b=AS:40
a=rtpmap:98 H263-2000/90000
a=control: rtsp://example.com/foo/track_id=1
a=fmtp:98 profile=0; level=10; bw=18, 27, 40

In this SDP body, the ending portion of the last attribute line shown indicates the available bandwidths of a multi-rate codec, these are: 18 kbps, 27 kbps and 40 kbps; the other fields of the SDP body being generally standardized and known as such. The bandwidth line b shows the initial default bandwidth to be used, that is 40 kbps.

Alternatively, it may just be communicated from the server 111 to the client 101 that there are multiple bit rates available without specifying each of them. An example of such an SDP body (only video part is shown) is:

m=video 0 RTP/AVP 98
b=AS:40
a rtpmap:98 H263-2000/90000
a=control: rtsp://example.com/foo/track_id=1
a=fmtp:98 profile=0; level=10; multi-bw In this SDP body, the ending portion of the last attribute line shown indicates that there are multiple bandwidths of a multi-rate codec available, but does not tell which ones. The other fields of the SDP body are generally standardized and known as such. The bandwidth line b shows the initial default bandwidth to be used, that is 40 kbps.

A preferred embodiment of the invention presents a client-server based method, wherein the client 101 monitors the changes in the available air-interface downlink bandwidth for streaming media. If the available bandwidth changes, for example due to changes in the time slot configuration or coding scheme (or modulation and coding scheme), the client 101 detects the change of the available bandwidth and requests the streaming server 111 to adapt the server bandwidth. By the term 'server bandwidth' is meant the transmission bit rate at which the server sends the streaming media.

Contrary to the prior-art solution described in the introductory portion of this application, the client 101, according to a preferred embodiment of the invention, does not request the server 111 to switch to sending at a specific bit rate, but rather the client informs the server of the current air-interface bandwidth (i.e. the maximum bit rate at which the client is able to receive the streaming media) and lets the server 111 decide which transmission bit rate to switch into based on that information. In other words the client 101 requests the server 111 to perform bandwidth adaptation and gives to the server 111 the current downlink bandwidth as a starting point.

This request can be performed using RTSP OPTIONS or RTSP SET_PARAMETER messages. These messages require one optional field, Bandwidth, to be implemented and understood at the client 101 and server 111. The field Bandwidth is already specified by the IETF (Internet Engineering Task Force) in the standard RFC 2326 (Real Time Streaming Protocol).

One example of such an OPTIONS message to be sent from the client 101 to the server 111 is as follows:

OPTIONS rtsp://example.com/foo RTSP/1.0
Cseq: 421
Content-length: 17
Content-type: text/parameters
Bandwidth: 27000

The new field 'Bandwidth' indicates the current available air-interface downlink bandwidth. The other fields of the OPTIONS message are generally standardized and known as such.

One example of a SET_PARAMETER message to be sent from the client 101 to the server 111 is as follows:

SET_PARAMETER rtsp://example.com/foo RTSP/1.0
Cseq: 421
Content-length: 17
Content-type: text/parameters
Bandwidth: 27000

Again, the field 'Bandwidth' indicates the current available air-interface downlink bandwidth. The other fields of the SET_PARAMETER message are generally standardized and known as such.

Upon receiving the OPTIONS or SET_PARAMETER message, the streaming server 111 acts upon the message. Now that the server 111 gets in the message (in the bandwidth field) the (actual) current maximum bit rate at which the client is able to receive the streaming media, the server performs bandwidth adaptation in order to adapt the transmission bit rate to the air-interface bandwidth in the most appropriate way. The server 111 is no longer limited to the prior-art bandwidth adaptation technique in which the server 111 either blindly accepted (executed) or disregarded the client's request for the server to send at a particular bit rate. But now that the server knows the current bandwidth it may alternatively or in addition also use other bandwidth adaptation techniques.

If, for example, the server has content encoded at bit rates 59 kbps, 50 kbps and 30 kbps, and the available air-interface bandwidth is suddenly dropped from 59.2 kbps to 44.8 kbps, the server 111 now knowing the actual air-interface bandwidth can, instead of choosing a new transmission bit rate of 30 kbps (which would have been the new bit rate in a prior-art case), choose a new transmission bit rate 50 kbps and, in addition, use another bandwidth adjustment technique to reduce the transmission bit rate from 50 kbps to exactly or close to 44.8 kbps. The mentioned another bandwidth adjustment technique may be, for example concerning a video stream, to use temporal scalability by skipping transmission of some frames (pictures). By skipping the transmission of some frames, it is possible to drop the effective server transmission rate from 50 kbps to 44.8 kbps without a considerable degradation in the quality of the video. At least the video quality should still be far better compared to sending at the bit rate of 30 kbps (which would have been the new bit rate in the prior-art case). Thus, according to a preferred embodiment of the invention, both the video quality may be improved compared to prior-art and more efficient use of the air-interface is enabled.

It is to be noted that contrary to prior-art, in a preferred embodiment of the invention, the client does not necessarily need to know the available individual server bit rates. This is the case if, for example, the aforementioned RTSP DESCRIBE message, in which it has just been communicated that there are multiple bit rates available without specifying each of them, has been used. Because, according to the preferred embodiment of the invention, the client device 101 sends to the server 111 only the current downlink air-interface bandwidth together with a request to adjust the server bit rate (instead of requesting the server to start sending at a specific bit rate) and lets the server make a decision, no problem arises. Knowing the actual downlink air-interface bandwidth, the server simply chooses the most appropriate bit stream alternative (i.e. the most appropriate bit rate stream possibility, together with an additional bandwidth adaptation technique (if needed)).

As already described in the foregoing, the most appropriate alternative may be to choose, from a set of bit rates supported by the server 111, the bit rate next lowest to the actual available air-interface bandwidth, or to choose a bit rate slightly higher than the actual available air-interface bandwidth but to use additional bandwidth adaptation technique (such as skipping transmission of some frames) in order to fit the server transmission bit rate into the actual available air-interface bandwidth.

Figure 2:
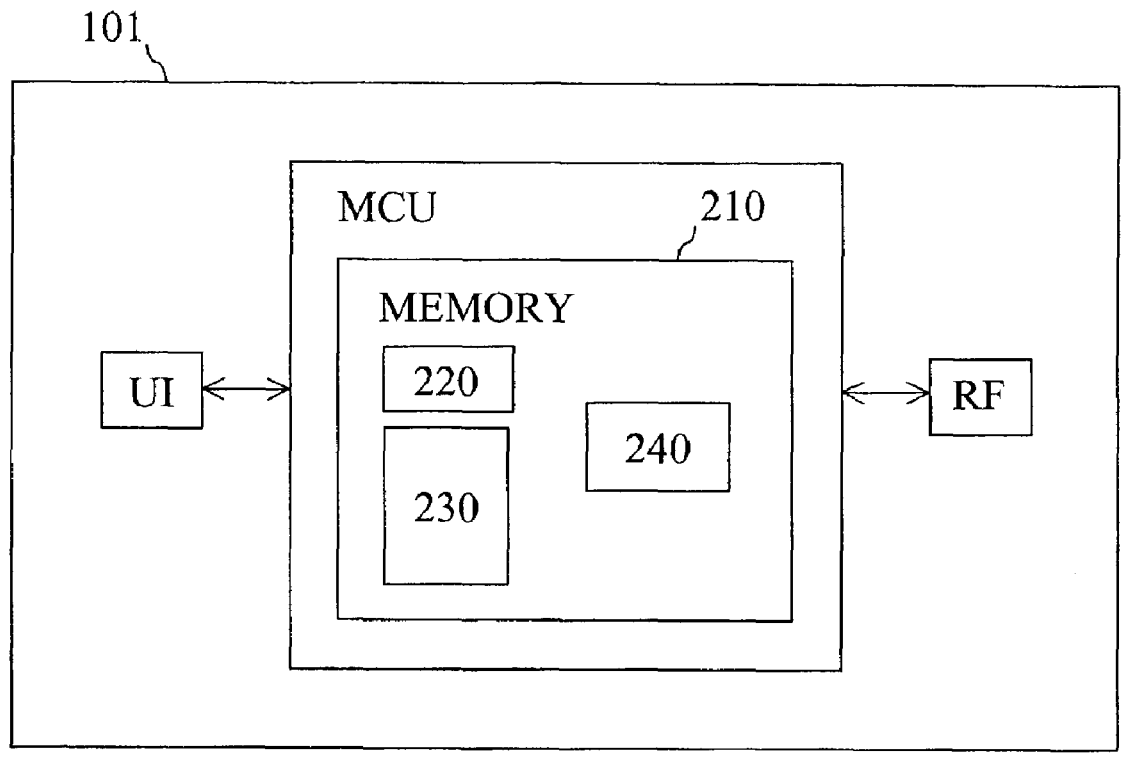
FIG. 2 shows a client device according to a preferred embodiment of the invention.

FIG. 2 shows a client device 101 according to a preferred embodiment of the invention. The client device may be a mobile station of a cellular radio telephone network. The client device 101 comprises a processing unit MCU, a radio frequency part RF, and a user interface UI. The radio frequency part RF and the user interface UI are coupled to the processing unit MCU. The user interface UI typically comprises a display, a speaker and a keyboard (not shown) with the aid of which a user can use the device 101.

The processing unit MCU comprises a processor (not shown), a memory 210 and computer software. The software has been stored in the memory 210. The processor controls, in accordance with the software, the operation of the client device 101, such as receiving messages (e.g. RTSP DESCRIBE) from the server 111 and sending requests (e.g. OPTIONS, SET_PARAMETER) to the server 111 via the radio frequency part RF, presentation of the received streaming media on the user interface UI and reading of inputs received from the keyboard of the user interface UI.

The software comprises a streaming client software application 220 (hereinafter referred to as client software 220), a protocol stack 230 for implementing necessary protocol layers such as an RTP layer, an RTSP layer, an SDP layer, a TCP layer (Transmission Control Protocol), an IP layer and, below the IP-layer, GPRS protocol layers and other lower layers. In addition, the software comprises means for implementing a buffer 240 in which the streaming media received from the streaming server 111 via the radio frequency part RF of the client device 101 is temporarily stored before played by a player (not shown) at the client device.

The client software 220 can receive bandwidth information from the lower layers of the protocol stack 230 via a lower layer application programming interface (API, not shown). For example, a GPRS phone is able to signal the instantaneous time slot configuration and error correction coding scheme from the lower layers to an application layer. Based on this bandwidth information, the client software 220, which naturally resides in an application layer, can calculate the current available air-interface downlink bandwidth.

In the context of UMTS (Universal Mobile Telecommunication System) networks, the client software 220 can use a guaranteed bit rate parameter of a QoS (Quality of Service) profile in determining the current available air-interface downlink bandwidth (this is also applicable in other networks in which such a parameter is provided). Then the current available air-interface downlink bandwidth may mean the currently 'guaranteed' air-interface downlink bandwidth. In these cases, after a PDP context (Packet Data Protocol) modification (or after a first activation of a PDP context) the client software 220 can signal a (granted) guaranteed bit rate to the server for the purpose of transmission bit rate adaptation.

Whenever the guaranteed bit rate parameter in the QoS profile cannot be used, the client software 220 can use an internal algorithm or other non specified means to estimate the current available air-interface downlink bandwidth.

In a preferred embodiment, the client software 220 takes bandwidth information at constant intervals via the API, calculates the mentioned current air-interface bandwidth, compares that bandwidth value with a previously stored bandwidth value and based on the comparison makes a decision on whether a new request to adjust the server bit rate should be sent. The streaming client software 220 also stores the current bandwidth value in the memory 210 so that it becomes the previously stored bandwidth value to which a comparison is made when the client software next time takes the bandwidth information via the API.

The foregoing can be presented as an algorithm which the client software 220 may execute upon reception of changes in bandwidth information from the lower layer API. The client software 220 may poll the bandwidth information at constant intervals.

The algorithm may be presented as follows:

```
If (Current_Bandwidth  Previous_Bandwidth) {
    Start timer Bandwidth_change_timer;
        If (Bandwidth_change_timer > k seconds)
            Send OPTIONS or SET_PARAMETER message with
            Bandwidth field.
Exp }
```

In this algorithm, the current bandwidth value is compared to the previously stored bandwidth value which represents the bandwidth available before the algorithm was triggered. If the two values are different, there are two possibilities:

1) Current bandwidth<previous bandwidth; this is a case of bandwidth downgrading.
2) Current bandwidth>previous bandwidth; this is a case of bandwidth upgrading.

In both cases 1 and 2, an action is taken and the OPTIONS or SET_PARAMETER message is sent from the client 101 to the server 111. The message to be sent is generated by the client software 220 in accordance with the RTSP protocol (as already indicated in the preceding) and is sent to the server 111 via the radio frequency part RF of the client device 101.

The bandwidth may vary very frequently. To avoid too many message transmissions and consequent unnecessary server actions within a small amount of time, a timer (Bandwidth_change_timer) is started upon the noticed bandwidth change. The OPTIONS or SET_PARAMETER message is sent only if the current bandwidth value (Current-_Bandwidth) persists for a predetermined suitable amount of time, namely k seconds. The suitable amount of time may be, for example, one or two seconds.

Figure 3:
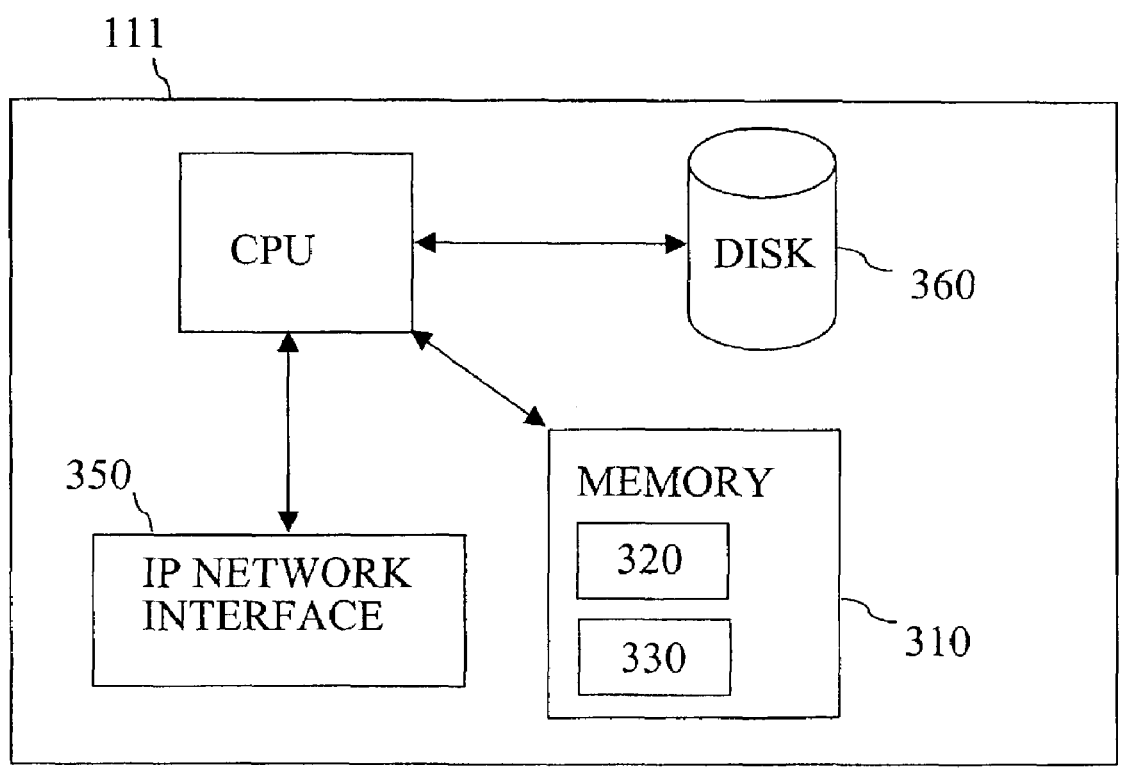
FIG. 3 shows a streaming server according to a preferred embodiment of the invention.

FIG. 3 shows a streaming server 111 according to a preferred embodiment of the invention. The streaming server 111 comprises a central processing unit CPU, a first memory 310, an IP network interface 350, and a second memory 360. The first memory 310, the IP network interface 350, and the second memory 360 are coupled to the central processing unit CPU.

The central processing unit CPU controls, in accordance with the computer software stored in the first memory 310, the operation of the streaming server 111, such as processing of requests received from the client device 101 and the sending of video and/or audio streams, stored in the second memory (disk) 360, to the client device 101 via the IP network interface 350.

The software comprises a streaming server software application 320 (hereinafter referred to as server software 320), a protocol stack 330 for implementing necessary protocol layers such as an RTP layer, an RTSP layer, an SDP layer, a TCP layer, an IP layer and lower protocol layers.

The server software 320 generates the aforementioned RTSP DESCRIBE message, in which the possible bit rates to be used in the streaming session may be communicated from the streaming server 111 to the client 101. The message is transmitted via the IP network interface 350. Also, the OPTIONS or SET_PARAMETER message (whichever is used) with the aid of which the client device 101 requests the server 111 to adapt its transmission bit rate is received at the server 111 via the IP network interface 350. The server software 320 processes the request and takes appropriate action.

In the following, alternative embodiments of the invention will be described.

In one alternative embodiment, in order to communicate during the session setup the possible server bit rate alternatives to be used in the streaming session, an RTSP DESCRIBE message comprising the following SDP body is sent from the server 111 to the client 101 (only video part is shown, audio is not shown):

m=video 0 RTP/AVP 98
b=AS:40
a=rtpmap:98 MP4V-ES/90000
a=control:trackID=4
a=fmtp:98 profile-level-id=8; config=010100000120008840066682C2090A21F
a range:npt=0-150.2
a=alt-default-id:4
a=alt:3:b=AS:18
a=alt:3:a=control:trackID=3
a=alt:5:b=AS:27
a=alt:5:a=control:trackID=5

This RTSP DESCRIBE message corresponds to a prior-art RTSP DESCRIBE message shown in the prior-art publication titled: *Proposal for Bandwidth Selection in PSS* (see the introductory portion of this application).

In this exemplary SDP body, the fifth attribute line (a-line) indicates that the default alternative is track 4, whose default bit rate is 40 kbps as the b-line indicates. The SDP also defines two other tracks: track 3 and track 5. Their default bit rates are 18 kbps and 27 kbps, respectively. The tracks have to do with different codecs. A single track may have streams encoded with a single (multi-rate) codec only. Thus, it may be so that track 4, for example, has a set of different bit rate video streams encoded with one codec and track 5 has a set of different bit rate video streams encoded with another codec.

Once the streaming session has been established, in this embodiment, the OPTIONS and SET_PARAMETER messages may be used. However, especially if a codec change is desired, the current available downlink air-interface bandwidth can be indicated to the server 111 with the aid of a PAUSE/PLAY message pair. First a PAUSE message is sent from the client 101 to the server 111 in order to pause the current transmission. Subsequently, a PLAY message comprising the aforementioned 'bandwidth' field with bandwidth information is sent from the client 101 to the server 111.

One example of the PAUSE message to be sent from the client 101 to the server 111 is as follows:

PAUSE rtsp://example.com/foo RTSP/1.0
CSeq: 6
Session: 354832

One example of the subsequent PLAY message to be sent from the client 101 to the server 111 is as follows:

PLAY rtsp://example.com/foo RTSP/1.0
CSeq: 7
Session: 354832
Bandwidth: 27000
Range: npt=28.00–

The field 'Bandwidth' indicates the current available downlink air-interface bandwidth. The other fields of the PAUSE and PLAY messages are generally standardized and known as such.

Contrary to the use of OPTIONS and SET_PARAMETER messages, wherein the switch of server transmission bit rates involves switching between different bit rates of a multi-rate codec, and wherein the codec can not be changed during the switch from one transmission bit rate to another, the PAUSE/PLAY method enables a codec change. Accordingly, in an alternative embodiment of the invention, the server 111 changes bit-rate and the codec based on the received current downlink air-interface bandwidth. The server may, for example, change from track 4 to track 5.

The present invention provides means for coping with air-interface bandwidth variations. By adapting, in the streaming session, the transmission bit rate of the streaming server into the current downlink air-interface bandwidth, application layer packet losses may be reduced. The preferred embodiments use preferably RTSP over TCP or RTSP over another reliable protocol in sending from the client device to the streaming server the message which carries the air-interface bandwidth information. The reception of the message at the streaming server can therefore basically be guaranteed.

Although the video part only has been shown in the preceding various examples, it should be clear that what has been presented concerning video should also correspondingly be applicable for audio.

Also, a message field named 'bandwidth' has been presented. However, it is not necessary that the field is named 'bandwidth' but another name will do as long as both the client device and the streaming server understood the meaning of that field, i.e. the bandwidth available at the client device. For example, a field named 'Max-bit-rate' or 'Guaranteed-bit-rate' can be used, especially, when a guaranteed bit rate has been determined based on the above mentioned bit rate parameter of a QoS profile (UMTS and other applicable networks).

It has also been suggested that the streaming media is streamed using pre-recorded media (video and/or audio) files. However, the invention is as well applicable to live-feed streaming, wherein a live video and/or live audio signal is encoded in real-time at the streaming server and is sent to the client device.

In connection with pre-recorded media files, the change from one streaming server transmission bit rate to another can, in practice, mean a switch from transmitting a first pre-recorded bit stream (comprising media content encoded such that it can be sent at a first bit rate) to transmitting a second pre-recorded bit stream (comprising the same media content encoded such that it can be sent at a second bit rate different from the first bit rate). If the media content has been encoded at a higher bit rate, this means that more bits have been used in encoding compared to encoding at a lower bit rate. This typically results in a better picture and/or sound quality.

Yet another embodiment of the invention further relates to the end-to-end streaming system shown in FIG. 1. In this embodiment, it has been discovered that the streaming client 101 should communicate to the streaming server 111 the type of network (or connection, i.e. PDP context type) the streaming client is attached. Namely, for example, there may exist two types of connections:

1) QoS-guaranteed connections;
2) Non-QoS-guaranteed (or best effort type) connections.

The QoS-guaranteed connections provide guaranteed bit rates (or bandwidth) for the client 101, whereas the non-QoS-guaranteed connections provide non-guaranteed bit rates for the client 101.

It is also possible that the streaming client 101 (e.g. a mobile station) performs roaming between different types of networks during a streaming session causing a dynamic scenario, such as the following: The client begins with a connection over a QoS-guaranteed network, but after some time, roams to a non-QoS-guaranteed network, or vice versa. It is most probable that the roaming between networks affects the quality of streaming media (the performance of a related streaming application), if the server 111 does not know what type of network connection the client 101 is using.

Therefore, in order to enable improved bandwidth (rate) adaptation, the streaming server 111 is, in this embodiment, informed about the current underlying network QoS-information (that is, the type of network (or connection)). This allows the server 111 to make more precise assumptions and decisions on the rate adaptation strategies to be used.

The streaming server 111 can be informed about the QoS-information by transferring a message (e.g. a signalling message) from the client 101 to the server 111. The message can be conveyed to the server via the RTSP protocol (by any applicable method) or via the RTCP protocol (Real-Time Control Protocol). The message can be of the following types:

1) "QoS-guaranteed"—this message is used to indicate that the current network connection is offering guaranteed bit rates.
2) "QoS-non-guaranteed"—this message is used to indicate that the current network connection is offering non-guaranteed (or best effort) bit rates. (The actual message names can be different as long as the semantics is the same.)

This message (QoS-guaranteed or QoS-non-guaranteed) can be sent by the streaming client 101 to the streaming server 111 in different moments of the lifetime of a connection. At least, the message can be sent after a PDP context activation (to communicate what network type will carry the media streams), and/or after a PDP context re-negotiation, and/or when up-grading or down-grading the connection as a result of network management or as a result of a user roaming to a network of different type.

In another alternative, the QoS-information is transmitted from the client 101 to the server 111 using the existing definition of the parameter 'Bandwidth' (or a semantically equivalent parameter for guaranteed bit rate) as defined already in the foregoing in the current patent application. The applicability of such parameter can be extended with the following semantics:

a) 'Bandwidth' parameter transmitted from client to server with a value>0 means that the bandwidth communicated is over a QoS-guaranteed network (i.e. the network offers guaranteed bit rates).
b) 'Bandwidth' parameter transmitted from client to server with a value=0 means that the network offers non-guaranteed bit rates.

In other words, if the value of the parameter 'Bandwidth' is greater than zero, for example 27000, this would mean that the current available downlink air-interface bandwidth is 27 kbps and also that the network is QoS-guaranteed. Whereas, if the value is zero, this would mean that the network is non-QoS-guaranteed.

The value of the parameter 'Bandwidth' can be conveyed in the messages presented in the foregoing embodiments, such as the RTSP OPTIONS or RTSP SET_PARAMETER message, or in another suitable message, which may be e.g. another RTSP or RTCP message. Any of these messages may contain, in addition to the parameter 'Bandwidth', an explicit "QoS-guaranteed" or "non-QoS-guaranteed" header. Alternatively, the header ("QoS-guaranteed" or "non-QoS-guaranteed") may be carried over a different message than the one containing the information about the current available downlink air-interface bandwidth.

The fact that the server 111 knows whether guaranteed or non-guaranteed bit rates are provided helps the server 111 in making assumptions and decisions (related to bandwidth adaptation strategies), such as:

If the network in question is QoS-guaranteed then:
the bandwidth value communicated by the client and the information available in RTCP Receiver Reports is to be taken into account in decision making; else:
only the information available in RTCP Receiver Reports is to be taken into account.

The RTCP Receiver Reports are packets transmitted from the client to the server. They contain information related to the quality of media reception at the client side (e.g. information on packet losses and delay jitter).

According to one embodiment of the invention the streaming server is located outside of a mobile operator's network (that is, in the public Internet). In this embodiment, the case may be that the mobile network bearer is QoS-guaranteed, but the network trunk between the streaming server and the entry point of the mobile network is non-QoS-guaranteed (that is, best effort). In such a case, there is a mixed networking scenario (QoS-guaranteed+non-QoS-guaranteed). The server can make use of the mismatch (or deviation) between the bandwidth information coming directly from the streaming client and the bandwidth estimation computed by the server itself by means of the RTCP Receiver Reports, to compute the actual bandwidth of the end-to-end network channel. Thereafter, the server may take appropriate bandwidth adaptation action.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method for packet switched streaming of media from a streaming server to a mobile client device over an air-interface, the method comprising:
noticing a change in a downlink air-interface bandwidth;
sending from the mobile client device to the streaming server a request for adapting streaming server transmission bit rate;
receiving the request at the streaming server;
adapting the streaming server transmission bit rate in accordance with the request, wherein the request indicates to the streaming server a current downlink air-interface bandwidth, and wherein said adapting of the streaming server transmission bit rate is performed in accordance with said current downlink air-interface bandwidth.

2. A method according to claim 1, wherein the current downlink air-interface bandwidth indicates a maximum bit rate at which the mobile client device is able to receive data.

3. A method according to claim 1, wherein the streaming server sends a media stream to the mobile client device via a mobile communications network.

4. A method according to claim 3, wherein the streaming server has an Internet Protocol connection to an internet protocol based network, which is coupled to the mobile communications network.

5. A method according to claim 3, wherein the mobile communications network is a mobile packet radio network, such as a General Packet Radio Service network.

6. A method according to claim 3, wherein said media stream comprise one of the following: a video stream, an audio stream, a multimedia stream.

7. A method according to claim 3, wherein the air-interface couples said mobile client device to said mobile communications network.

8. A method according to claim 1, wherein said adapting of the streaming server transmission bit rate is performed by switching the streaming server from sending at a first transmission bit rate to sending at a second transmission bit rate different from the first transmission bit rate.

9. A method according to claim 1, wherein said adapting of the streaming server transmission bit rate is performed by switching the streaming server from sending a first media stream which is encoded at a first bit rate to sending a second media stream which is encoded at a second bit rate different from the first bit rate.

10. A method according to claim 9, wherein said media streams form part of pre-recorded media files.

11. A method according to claim 9, wherein said media streams form part of a live streaming media transmission.

12. A method according to claim 9, wherein the first and second bit rates are bit rates provided by a multi-rate encoder.

13. A method according to claim 9, wherein a media stream encoded at a bit rate higher than the current downlink air-interface bandwidth is chosen for transmission and the streaming server transmission bit rate is adjusted to correspond to the current downlink air-interface bandwidth with the aid of additional adapting.

14. A method according to claim 13, wherein the additional adapting comprises dynamic adaptation by the streaming server.

15. A method according to claim 14, wherein the dynamic adaptation comprises using temporal scalability by skipping transmission of a part of the media stream in order to fit the streaming server transmission bit rate into the current downlink air-interface bandwidth.

16. A method according to claim 15, wherein the skipping of transmission of a part of the media stream comprises skipping transmission of some video frames.

17. A method according to claim 1, wherein, for adapting the streaming server transmission bit rate, a streaming server transmission bit rate next lowest to the current downlink air-interface bandwidth, from a set of available streaming server transmission bit rates, is chosen for transmission.

18. A method according to claim 1, wherein the mobile client device and the streaming server have an ongoing streaming session and said noticing of a change in a downlink air-interface bandwidth occurs during the ongoing streaming session.

19. A method according to claim 1, wherein the request for adapting the streaming server transmission bit rate is generated and sent in response to notifying the change in the downlink air-interface bandwidth.

20. A method according to claim 1, wherein the request for adapting the streaming server transmission bit rate is only sent after the current downlink air-interface bandwidth has persisted a predetermined duration of time.

21. A method according to claim 1, wherein the request for adapting the streaming server transmission bit rate is an application layer request.

22. A method according to claim 1, wherein the mobile client device comprises a cellular mobile phone.

23. A method according to claim 1, wherein the current downlink air-interface bandwidth indicates a currently guaranteed air-interface downlink bandwidth.

24. A method according to claim 1, wherein the notifying of the change in a downlink air-interface bandwidth occurs via an application programming interface.

25. A method according to claim 1, wherein the request is sent in a message which comprises a message field, such as a Bandwidth-field, for indicating the current downlink air-interface bandwidth.

26. A method according to claim 25, wherein said message field is a message header field.

27. A method according to claim 1, wherein, in a streaming session setup, information on available different bit rate media streams is communicated to the mobile client device.

28. A method according to claim 1, wherein, in a streaming session setup, it is communicated to the client device that there are multiple bit rates or multiple bit rate streams available without specifying each of them.

29. A method according to claim 28, wherein the information is communicated from the streaming server to the client device in a Session Description Protocol body of an Real Time Streaming Protocol DESCRIBE message.

30. A method according to claim 1, wherein the request is sent in one of the following messages: a Real Time Streaming Protocol OPTIONS, a Real Time Streaming Protocol SET$_{13}$PARAMETER, a Real Time Streaming Protocol PLAY message.

31. A method according to claim 1, wherein an encoder change is performed when adapting the streaming server transmission bit rate.

32. A method according to claim 1, wherein the streaming server is provided with Quality of Service information to be used in said adapting of the streaming server transmission bit rate, said quality of service information indicating whether or not a guaranteed bandwidth is provided for the streaming media.

33. A mobile client device for receiving packet switched streaming media from a streaming server over an air-interface, the mobile client device comprising:
   means for noticing a change in a downlink air-interface bandwidth; and
   means for sending to the streaming server a request for adapting streaming server transmission bit rate, the request containing information for indicating to the streaming server a current downlink air-interface bandwidth for adapting the streaming server transmission bit rate in accordance within said current downlink air-interface bandwidth.

34. A mobile client according to claim 33, wherein the current downlink air-interface bandwidth indicates a maximum bit rate at which the mobile client device is able to receive data.

35. A streaming server for sending packet switched streaming media to a mobile client device over an air-interface, the streaming server comprising:
   means for receiving a request for adapting streaming server transmission bit rate, the request containing information indicating a current downlink air-interface bandwidth; and
   means for adapting the streaming server transmission bit rate in accordance with said current downlink air-interface bandwidth.

36. A streaming server according to claim 35, further comprising means for switching the streaming server from sending at a first transmission bit rate to sending at a second transmission bit rate different from the first transmission bit rate.

37. A system comprising a streaming server and a mobile client device, for packet switched streaming of media from the streaming server to the mobile client device over an air-interface, the system comprising, at the mobile client device:
- a processor for noticing a change in a downlink air-interface bandwidth; and
- a transmitter for sending to the streaming server a request for adapting streaming server transmission bit rate, the request containing information for indicating to the streaming server a current downlink air-interface bandwidth, the system further comprising, at the streaming server:
- an interface for receiving the request; and
- a processing unit for adapting the streaming server transmission bit rate in accordance with said current downlink air-interface bandwidth.

38. A computer program product executable in a mobile client device, the computer program product comprising a computer readable storage structure embodying computer program code thereon for execution by a computer processor, wherein said computer program code comprises instructions for:
- causing the mobile client device to notice a change in a downlink air-interface bandwidth; and
- causing the mobile client device to send to the streaming server a request for adapting streaming server transmission bit rate, the request containing information for indicating to the streaming server a current downlink air-interface bandwidth for adapting the streaming server transmission bit rate in accordance with said current downlink air-interface bandwidth.

39. A computer program product executable in a streaming server, the computer program product comprising a computer readable storage structure embodying computer program code thereon for execution by a computer processor, wherein said computer program code comprises instructions for:
- causing the streaming server to receive a request for adapting streaming server transmission bit rate, the request containing information indicating a current downlink air-interface bandwidth; and
- causing the streaming server to adapt the streaming server transmission bit rate in accordance with said current downlink air-interface bandwidth.

40. A mobile client device for receiving packet switched streaming media from a streaming server over an air-interface, the mobile client device comprising:
- a processor for noticing a change in a downlink air-interface bandwidth; and
- a transmitter for sending to the streaming server a request for adapting streaming server transmission bit rate, the request containing information for indicating to the streaming server a current downlink air-interface bandwidth for adapting the streaming server transmission bit rate in accordance with said current downlink air-interface bandwidth.

41. A mobile client device according to claim 40, wherein the current downlink air-interface bandwidth indicates a maximum bit rate at which the mobile client device is able to receive data.

42. A mobile client device according to claim 40, wherein the mobile client device comprises a cellular mobile phone.

43. A mobile client device according to claim 40, wherein the request is sent in a message which comprises a message field, such as a Bandwidth-field, for indicating the current downlink air-interface bandwidth.

44. A streaming server for sending packet switched streaming media to a mobile client device over an air-interface, the streaming server comprising:
- an interface for receiving a request for adapting streaming server transmission bit rate, the request containing information indicating a current downlink air-interface bandwidth; and
- a processing unit for adapting the streaming server transmission bit rate in accordance with said current downlink air-interface bandwidth.

45. A streaming server according to claim 44, wherein the current downlink air-interface bandwidth indicates a maximum bit rate at which the mobile client device is able to receive data.

46. A streaming server according to claim 44, wherein the streaming server is configured to send a media stream to the mobile client device via a mobile communications network.

47. A streaming server according to claim 44, wherein said processing unit is configured to perform adapting of the streaming server transmission bit rate by switching the streaming server from sending at a first transmission bit rate to sending at a second transmission bit rate different from the first transmission bit rate.

* * * * *

UNITED STATES PATENT AND TRADEMARK OFFICE
CERTIFICATE OF CORRECTION

| | | |
|---|---|---|
| PATENT NO. | : 7,346,007 B2 | Page 1 of 1 |
| APPLICATION NO. | : 10/369098 | |
| DATED | : March 18, 2008 | |
| INVENTOR(S) | : Igor Danilo Diego Curcio et al. | |

It is certified that error appears in the above-identified patent and that said Letters Patent is hereby corrected as shown below:

In column 16, line 27 (claim 30, line 4), "$SET_{13}PARAMETER$" should be --SET_PARAMETER--.

In column 16, line 48 (claim 33, line 11), "within" should be --with--.

Signed and Sealed this

Eighth Day of July, 2008

JON W. DUDAS
*Director of the United States Patent and Trademark Office*